(No Model.)
H. WESTPHAL & E. DIETERLA.
SHACKLE FOR CARRIAGE SPRINGS.
No. 295,318. Patented Mar. 18, 1884.
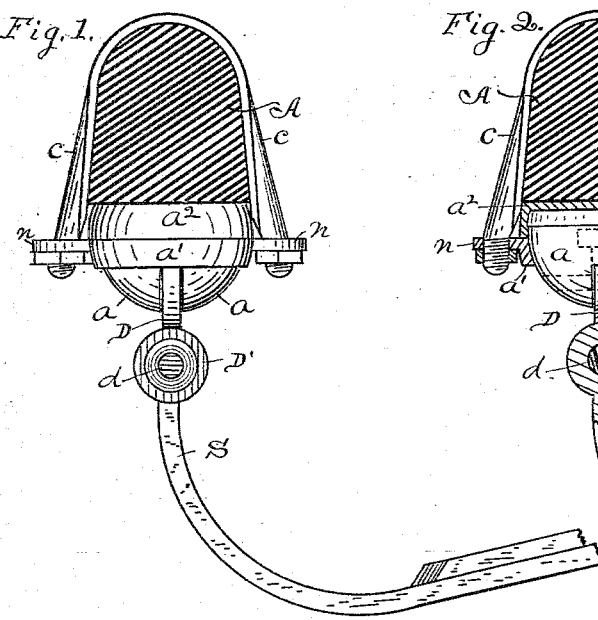
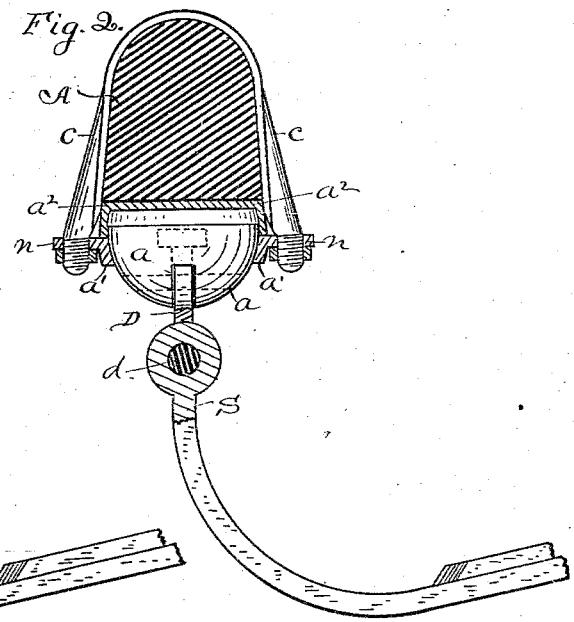
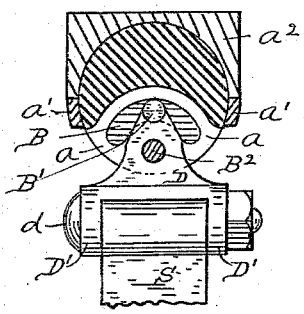
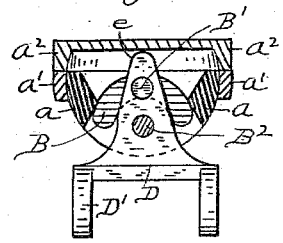
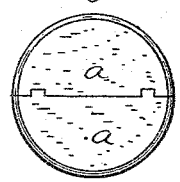
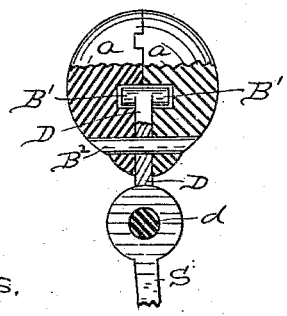
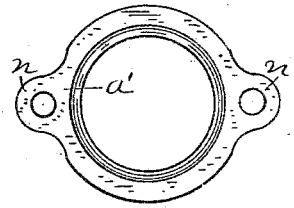
Witnesses.
Inventors.
Henry Westphal.
Edward Dieterla

UNITED STATES PATENT OFFICE.

HENRY WESTPHAL AND EDWARD DIETERLA, OF CHICAGO, ILLINOIS.

SHACKLE FOR CARRIAGE-SPRINGS.

SPECIFICATION forming part of Letters Patent No. 295,318, dated March 18, 1884.

Application filed July 31, 1883. (No model.)

*To all whom it may concern:*

Be it known that we, HENRY WESTPHAL and EDWARD DIETERLA, citizens of the United States of America, residing at Chicago, in the county of Cook and State of Illinois, have invented certain new and useful Improvements in Shackles for Carriage-Springs, of which the following is a specification, reference being had therein to the accompanying drawings.

Figure 1 is a side view of the shackle and a cross-sectional view of the side-bar of a carriage; Fig. 2, a similar view, showing the socket-case in vertical cross-section; Figs. 3 and 4, vertical sectional views of the part of the shackle, showing the ball-and-socket joint; Fig. 5, a view on the top of the semi-spherical ball, as in Fig. 4; Fig. 6, a view of the ball or sphere $a$, showing how its two parts are united; and Fig. 7 a plan view on the top of the seat or socket for supporting the ball $a$.

This invention relates to certain improvements in the shackle of a carriage-spring for connecting the body of a carriage with the running-gear on the principle of the ball-and-socket joint, whereby a universal movement or motion is given the ball and the end of the spring thereto attached.

In the drawings, A represents the side-bar of the buggy and $c$ the ordinary clip for attaching the shackle to the side-bar. The shackle proper consists of the circular plate $a'$, (shown more particularly in Fig. 7,) having the ears $n$ $n$ for the reception of the clip, and the circular concave opening forming the seat or socket for the reception of the ball $a$, in which seat or socket the ball rolls according to the motion of the carriage. A cover or plate, $a^2$, covers the ball $a$ and plate $a'$, to exclude dust and cover up the parts. The ball $a$ is provided with the slot across its lower end for the reception of the link D, held therein by the pin $B^2$, and to which link the spring S hinges by means of the ears D' and bolt $d$, as shown more particularly in Figs. 3 and 4. By this method of hinging the end to the bottom of the ball it is permitted to roll in any direction in its seat, to cushion any jar or jolt of the carriage, and permits a side swing to the body as well as an end swing. To prevent accident in case the pin $B^2$ should break or wear out, the upper end of the link is provided with a pair of opposite lugs, B', which enter corresponding curved recesses, B, within the ball $a$, so that if the pin $B^2$ should break, the lugs B' will support the link D and prevent it dropping down and out.

The ball $a$ may be made in halves, so it may be easy to insert the link therein, and it may be a perfect sphere or semi-spherical in form, as shown in Figs. 2 and 4. If it is spherical, then such a cover, $a^2$, is used as shown in Fig. 3. If flat or half-sphere, then such cover may be used as shown in Fig. 4, having a space between the ball and the cover, so the ball can roll to a sufficient degree. The great object of this construction of the shackle is to permit the attached end of the springs to swing or move in any direction, so that the body may be attached to the running-gear with as little rigidity as possible, yielding to any movement or jar of the running-gear and giving a motion delightfully free from any sudden concussions or jolts from whatever direction or cause.

When a semi-spherical ball is used, it is necessary that there should be a space between its upper surface and the cover or cap $a^2$, to permit it to roll in any direction. To prevent any jumping up or rattling of the ball within the cover $a^2$, the link D extend upward far enough to meet the cap $a^2$, as shown at $e$, Fig. 4. The ball may be provided with a slight enlargement at its lower side to give more metal to support the pin $B^2$, as is shown in Fig. 6.

The shackle may be inverted if desired, so the link D will bear against the bar A, and be held thereto by the clip C in ears formed on said link, and the spring S be suspended from ears projecting from the seat $a'$, thereby dispensing with the cover $a^2$. In either case the same result will be attained. It will merely be changing the ears $n$ on seat $a'$ to the link D, and the ears D' on the link D to the seat $a'$.

Having thus described our invention, what we claim as new, and desire to secure by Letters Patent, is as follows, to wit:

1. In the spring-shackle described, the combination of the ball $a$, seat $a'$, cover $a^2$, link D, pin $B^2$, spring S, and clip C, all attached to the bar A, as shown, and arranged to operate as and in the manner set forth.

2. The combination of the spherical or semi-spherical body $a$, having the lugs B', pin $B^2$, and seat $a'$, attached to the side bar, A, by the clip C, and adapted to support the body of the carriage on the springs S, in the manner and for the purpose set forth.

3. The combination of the ball $a$, seat $a'$, and link D, adapted to connect the body of the carriage to the running-gear, as and for the purpose set forth.

4. In the carriage-spring shackle described, the ball $a$, having the curved recesses B, in combination with the link D, having the lugs B', and the seat or socket $a'$, as and for the purpose set forth.

HENRY WESTPHAL.
EDWARD DIETERLA.

Witnesses:
 A. F. RAVERET,
 WM. J. HUTCHINS.